Oct. 26, 1965   M. J. D'ERRICO ETAL   3,214,622
ELECTROLUMINESCENT LAMP WITH HIGH DIELECTRIC CONSTANT
THERMOPLASTIC PHOSPHOR-BEARING MATRIX
Filed April 27, 1962

INVENTORS.
MICHAEL J. D'ERRICO
EDWARD J. FETTER
BY *Frank M. Van Riet*

ATTORNEY

United States Patent Office 3,214,622
Patented Oct. 26, 1965

3,214,622
ELECTROLUMINESCENT LAMP WITH HIGH DI-
ELECTRIC CONSTANT THERMOPLASTIC PHOS-
PHOR-BEARING MATRIX
Michael J. D'Errico and Edward J. Fetter, Stamford,
Conn., assignors to American Cyanamid Company,
Stamford, Conn., a corporation of Maine
Filed Apr. 27, 1962, Ser. No. 190,817
11 Claims. (Cl. 313—108)

The present invention is concerned with electroluminescent devices and to other electrical apparatus and has particular reference to matrices composed of a polymeric material, having a high dielectric constant, which is particularly suitable for use in electrical capacitors and the like.

More particularly, this invention relates to novel, unitary, multi-layer electroluminescent devices comprising two or more electrically conductive surfaces having interposed therebetween a novel phosphor-containing dielectric material.

Still more particularly, this invention relates to novel electrical capacitors having as the interior assembly thereof a polymeric material possessing a high dielectric constant.

Still more particularly, this invention relates to a novel process for the fabrication of electrical devices comprising adhering the components present in said devices to one another with a polymeric material possessing a high dielectric constant and a low dissipation factor.

Electroluminescent devices, such as those contemplated by the instant invention, are basically simple structures comprising in essence, two electrodes, at least one of which transmits light, between which a phosphor is embedded in a suitable matrix.

Capacitors, on the other hand, are somewhat more complex devices generally comprising a metal casing within which are located a plurality of separate metal foil electrodes. Generally, there will be located inside the casing, a pair of electrodes composed of an electrically conductive metal such as aluminum, tin, copper or the like. Said electrodes are usually separated from one another by at least one sheet of another material. The metallic sheets which form the electrodes are then tightly wound with the other material interposed therebetween to prevent electrical contact between the electrodes. The wound element is then inserted into the metal casing and connected to terminal contact members extending through the casing. After all traces of moisture and other volatile substances have been removed by heat treatment, the casing is permanently sealed.

One important requirement for a suitable matrix in illuminescent devices is that it have a high dielectric constant. The same requirement is necessary for the material which is used as the insulation between the electrodes present inside the casings of capacitors. Among the dielectric matrices for electroluminescent phosphors and the insulators and separators for capacitors which have been suggested are the cyano ethers of cellulose, see for example U.S. Patents 2,774,004, 2,792,447, 2,-901,652, 2,918,594 and 2,920,256. These patents generally suggest the use of certain types of cyanoethylated cellulose as a preferred material of high dielectric constant.

It has been found, however, that although cyanoethylated cellulose is excellent in regard to its dielectric constant, it possesses other characteristics which detract from the commercial attractiveness of the products produced from it, e.g., electroluminescent devices and capacitors. The primary disadvantage of the use of cyanoethylated cellulose is its high cost. This high cost stems directly from the increased cost of manufacture of the cyanoethylated cellulose. Specifically, the need for extensive washing of the cellulose which has been cyanoethylated adds greatly to its cost and therefore the selling price of products containing cyanoethyl cellulose must be proportionately increased. Additionally, the matrix of an electroluminescent device must solidly adhere to the electrodes of the device and cyanoethylated celluluose, although satisfactory, has not exhibited the best results in this regard. Accordingly, it can be seen that there still exists an acute need for new materials which may be used in electroluminescent devices and capacitors etc. which couple the property of a high dielectric constant with good adhesion.

It has now been discovered that electrical capacitors of high capacitance per unit value, and electroluminescent devices having a low production cost and excellent properties regarding fabrication and adhesion, can be produced utilizing the polymeric solid resinous material hereinafter described.

It is therefore an object of the present invention to develop a composition suitable for such dielectric purposes as the preparation of phosphor-bearing matrices, capacitor assemblies and the like without being subject to the above noted deficiencies of high cost and poor adhesion.

A further object of the present invention is to provide electrical apparatus insulated by and composed of a material having a relatively high dielectric constant.

Still another object of the present invention is to provide electroluminescent devices composed of matrices having high dielectric constants, good adhesion, water resistance, clarity, low dissipation factors, good dielectric strength, good mechanical strength and facility of production.

Still another object of the present invention is to provide electrical capacitors having associated therewith sheet material having a relatively high dielectric constant, said sheet material comprising sheets of a polymer of a cyanoalkoxy alkyl acrylate or methacrylate.

Still another object of the present invention is to provide a method for the production or fabrication of various electrical apparatus comprising the adhering of the components present in said apparatus to one another with a polymeric material having a high dielectric constant and a low dissipation factor.

Other and further objects of the present invention will become more apparent upon reading the more detailed description set forth hereinbelow.

In regard to electroluminescent devices, it should again be stated that matrices used in such devices should possess high dielectric constants, low dissipation factors, good adhesion to substrates, i.e., glass, good water resistance and clarity, good dielectric strength, good mechanical strength and good tear and tensile strength.

To be acceptable for such purposes, the matrix should have a dielectric constant as high as possible. It is also recognized that the dissipation factor should be as low as possible since a high dissipation factor is related to the conversion of electrical energy into unwanted heat. In addition, such matrices should be substantially colorless in order to emit the most possible light therethrough. The matrix should have a sufficiently high dielectric strength to permit operation at higher voltages without breakdown. Preferably the higher the dielectric constant and dielectric strength and the lower the dissipation factor, the better the electroluminescent device.

The degree of adhesion of the matrix to a conductive coating on a suitable transparent or translucent electrode should be relatively high to be satisfactory. Such an electrode is typically a glass sheet or some other physically equivalent transparent or translucent non-conductor having a conductive coating on one surface thereof. A typical coating will consist of a tin oxide film (U.S. Patent No. 2,838,715) or its equivalent. In order to obtain the desired electrical contact, adhesion of the phosphor-containing matrix to the conductive coating must be sufficient to insure that the matrix film will not peel spontaneously from the conductive surface during drying of the film which follows the casting or spraying of a suitable solution onto the conductive surface of the electrode.

While a low tensile strength of the matrix is not as serious a drawback as is poor adhesion, any improvement in this direction is also desirable particularly, for example, in regard to flexible electroluminescent panels.

We have found that matrices and capacitor assemblies possessing all the above-mentioned requirements can be produced utilizing, as the material thereof, various polymers of cyanoalkoxy alkyl acrylates and methacrylates. These polymers of the cyanoalkoxy alkyl acrylates and methacrylates are known in the art and may be prepared from monomers having the following formula I 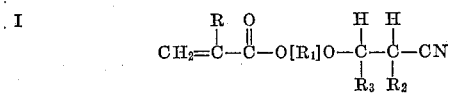

wherein R is a hydrogen or methyl radical, $R_1$ is a $(-CH_2-)_n$, $-CH_2-CH_2-O-CH_2-CH_2-$ or $-CH_2-CH-$
$\phantom{(-CH_2-)_n, -CH_2-CH_2-O-CH_2-CH_2- or -CH_2-CH}|$
$\phantom{(-CH_2-)_n, -CH_2-CH_2-O-CH_2-CH_2- or -CH_2-CH}CH_3$ radical, $n$ being a whole positive integer of from 2 to 5 inclusive, $R_2$ is hydrogen or a methyl radical and $R_3$ is hydrogen, a methyl radical or a $C_6H_5$ radical, at least one of $R_2$ and $R_3$ being hydrogen.

We have found that the polymers produced from the above-mentioned monomers are far superior as electroluminescent device matrices, capacitor assemblies and the like than commercially available materials. The polymers are such that their tackiness permits greater phosphor loading of the matrix, thereby resulting in lamps of greater brightness. Additionally, the polymers, even when containing a high phosphor load, produce excellent adhesion of the matrices to the other lamp components. Such an adhesive character therefore obviates the need for external adhesives and plasticizers in the fabrication of the lamps. Another feature of the polymers employed in the present invention resides in the fact that the high dielectric constants of the polymers enables a greater voltage drop to be placed across the phosphor particles, further enhancing the brilliance of the lamps.

When used as assembly components in electrical capacitors, the polymers of the monomers disclosed above also enable the size of said capacitors to be greatly reduced due to the aforementioned high dielectric constant of the polymers.

It can be seen therefore that the electrical devices of the present invention are far superior to commercially available devices in every essential property and characteristic of such devices necessary to gain the most effective use of the materials used therein in regard to performance, stability and ease of fabrication.

As mentioned above, these acrylates and methacrylates are known in the art and generally may be produced or polymerized by any method known in the art, such as by those methods disclosed in U.S. Patents 2,495,214 and 2,669,558. The polymers of these acrylates and methacrylates may alternatively be produced according to the method set out in Example 1, below. The preparation of the monomers or the polymers of the monomers represented by Formula I, above, however, constitutes no part of this invention.

Examples of the compounds which may be used to form polymers for use in the present invention and which are represented by Formula I, above, include such compounds as:

2-(2-cyanoethoxy)ethyl acrylate,
2-(2-cyanopropoxy)ethyl acrylate,
2-(2-cyano-1-phenylethoxy)ethyl acrylate,
2-(2-cyano-1-methylethoxy)ethyl acrylate,
2-(2-cyanoethoxy)ethyl methacrylate,
2-(2-cyanopropoxy)ethyl methacrylate,
2-(2-cyano-1-phenylethoxy)ethyl methacrylate,
2-(2-cyano-1-methylethoxy)ethyl methacrylate,
3-(2-cyanoethoxy)propyl acrylate,
3-(2-cyanopropoxy)propyl acrylate,
3-(2-cyano-1-phenylethoxy)propyl acrylate,
3-(2-cyano-1-methylethoxy)propyl acrylate,
3-(2-cyanoethoxy)propyl methacrylate,
3-(2-cyanopropoxy)propyl methacrylate,
3-(2-cyano-1-phenylethoxy)propyl methacrylate,
3-(2-cyano-1-methylethoxy)propyl methacrylate,
4-(2-cyanoethoxy)butyl acrylate,
4-(2-cyanopropoxy)butyl acrylate,
4-(2-cyano-1-phenylethoxy)butyl acrylate,
4-(2-cyano-1-methylethoxy)butyl acrylate,
4-(2-cyanoethoxy)butyl methacrylate,
4-(2-cyanopropoxy)butyl methacrylate,
4-(2-cyano-1-phenylethoxy)butyl methacrylate,
4-(2-cyano-1-methylethoxy)butyl methacrylate,
5-(2-cyanoethoxy)pentyl acrylate,
5-(2-cyanopropoxy)pentyl acrylate,
5-(2-cyano-1-phenylethoxy)pentyl acrylate,
5-(2-cyano-1-methylethoxy)pentyl acrylate,
5-(2-cyanoethoxy)pentyl methacrylate,
5-(2-cyanopropoxy)pentyl methacrylate,
5-(2-cyano-1-phenylethoxy)pentyl methacrylate,
5-(2-cyano-1-methylethoxy)pentyl methacrylate,
2-[2-(2-cyanoethoxy)ethoxy]ethyl acrylate,
2-[2-(2-cyanopropoxy)ethoxy]ethyl acrylate,
2-[2-(2-cyano-1-phenylethoxy)ethoxy]ethyl acrylate,
2-[2-(2-cyano-1-methylethoxy)ethoxy]ethyl acrylate,
2-[2-(2-cyanoethoxy)ethoxy]ethyl methacrylate,
2-[2-(2-cyanopropoxy)ethoxy]ethyl methacrylate,
2-[2-(2-cyano-1-phenylethoxy)ethoxy]ethyl methacrylate,
2-[2-(2-cyano-1-methylethoxy)ethoxy]ethyl methacrylate,
2-(2-cyanoethoxy)propyl acrylate,
2-(2-cyanopropoxy)propyl acrylate,
2-(2-cyano-1-phenylethoxy)propyl acrylate,
2-(2-cyano-1-methylethoxy)propyl acrylate,
2-(2-cyanoethoxy)propyl methacrylate,
2-(2-cyanopropoxy)propyl methacrylate,
2-(2-cyano-1-phenylethoxy)propyl methacrylate,
2-(2-cyano-1-methylethoxy)propyl methacrylate, and the like.

The polymers of the cyanoalkoxy alkylacrylates and methacrylates which are used as the lamp matrices and capacitor assemblies in the present invention may be used in the form of homopolymers, copolymers of various mixtures thereof or copolymers thereof with other monomers copolymerizable therewith and containing a polymerizable $CH_2=C<$ group. When copolymers are utilized they should contain at least about 50%, by weight, of the cyanoalkoxy alkyl acrylate or methacrylate and not more than 50% of the monomer, or group of monomers, copolymerizable therewith, preferably 70% to 95% and 30% to 5%, respectively.

Examples of monomers which can be copolymerized with the monomers represented by Formula I, and which can be copolymerized either singly or in a plurality (two, three, four or any desired number), the latter often being desirable in order to improve the compatability and copolymerization characteristics of the mixture of monomers and to obtain copolymers having the particular properties desired for the particular service application, are such monomers as the unsaturated alcohol esters, more particularly the allyl, methallyl, crotyl, 1-chloroallyl, 2-chloroallyl, cinnamyl, vinyl, methvinyl, 1-phenylallyl, butenyl, etc., esters of saturated and unsaturated aliphatic and aromatic monobasic and polybasic acids such, for instance, as acetic, propionic, butyric, valeric, caproic, crotonic, oxalic, malonic, succinic, glutaric, adipic, pimelic, suberic, azelaic, sebacic, maleic, fumaric, citraconic, mesaconic, itaconic, acetylene dicarboxylic, aconitic, benzoic, phenylacetic, phthalic, terephthalic, benzoylphthalic, etc., acids; the saturated monohydric alcohol esters, e.g., the methyl, ethyl, propyl, isopropyl, butyl, sec.-butyl, amyl, etc., esters of ethylenically unsaturated aliphatic monobasic and polybasic acids, illustrative examples of which appear above; vinyl cyclic compounds (including monovinyl aromatic hydrocarbons), e.g., styrene, o-, m-, and p-chlorostyrenes, -bromostyrenes, -fluorostyrenes, -methylstyrenes, -ethylstyrenes, -cyanostyrenes, the various poly-substituted styrenes such, for example, as the various di-, tri-, and tetra-chlorostyrenes, -bromostyrenes, -fluorostyrenes, -methylstyrenes, -ethylstyrenes, -cyanostyrenes, etc., vinyl naphthalene, vinylcyclohexane, vinyl furane, vinyl pyridine, vinyl dibenzofuran, divinyl benzene, trivinyl benzene, allyl benzene, diallyl benzene, N-vinyl carbazole, the various allyl cyanostyrenes, the various alpha-substituted styrenes and alpha-substituted ring-substituted styrenes, e.g., alpha-methyl styrene, alpha-methyl-paramethyl styrene, etc.; unsaturated ethers, e.g., ethyl vinyl ether, diallyl ether, ethyl methallyl ether, etc.; unsaturated amides, for instance, N-allyl caprolactam, acrylamide, and N-substituted acrylamides, e.g., N-methylol acrylamide, N-allyl acrylamide, N-methyl acrylamide, N-phenyl acrylamide, etc.; unsaturated ketones, e.g., methyl vinyl ketone, methyl allyl ketone, etc.; methylene malonic esters, e.g., methylene methyl malonate, etc.; ethylene; unsaturated polyhydric alcohol (e.g., butenediol, etc.) esters of saturated and unsaturated, aliphatic and aromatic, monobasic and polybasic acids.

Other examples of monomers that can be copolymerized with the monomers of Formula I are the vinyl halides, more particularly vinyl fluoride, vinyl chloride, vinyl bromide and vinyl iodide, and the various vinylidene compounds, including the vinylidene halides, e.g., vinylidene chloride, vinylidene bromide, vinylidene fluoride and vinylidene iodide, other comonomers being added if needed in order to improve the compatibility and copolymerization characteristics of the mixed monomers.

More specific examples of allyl compounds that can be copolymerized with the compounds of Formula I are allyl alcohol, methallyl alcohol, diallyl carbonate, allyl lactate, allyl alphahydroxyisobutyrate, allyl trichlorosilane, diallyl methylgluconate, diallyl tartronate, diallyl tartrate, diallyl mesaconate, the diallyl ester of muconic acid, diallyl chlorophthalate, diallyl dichlorosilane, the diallyl ester of endomethylene tetrahydrophthalic anhydride, triallyl tricarballylate, triallyl cyanurate, triallyl citrate, triallyl phosphate, tetrallyl silane, tetrallyl silicate, hexallyl disiloxane, etc. Other examples of allyl compounds that may be employed are given, for example in U.S. Patent No. 2,510,503, issued June 6, 1950.

Among the comonomers which are preferred for use in carrying our invention into effect are, for example, compounds such as methyl methacrylate, acrylonitrile, and other compounds, e.g., the various substituted acrylonitriles (e.g., methacrylonitrile, ethacrylonitrile, phenylacrylonitrile, etc.), the various di-N-substituted acrylamides and alkacrylamides, for instance, N-dialkyl acrylamides and methacrylamides, e.g., N-dimethyl, -diethyl, -dipropyl, -dibutyl, etc., acrylamides and methacrylamides. Other monomers copolymerizable with the instant novel monomers are given, for instance, in U.S. Patent No. 2,601,572, dated June 24, 1952, where examples are given both by classes and species.

Of course, it is also possible to utilize copolymers produced from two or more of the monomers represented by Formula I, above, and still obtain the benefits heretofore set forth.

The polymers, in solution, are generally treated to incorporate the phosphor therein and are then spread on the conductive glass. The preferred amount of phosphor to be incorporated into the polymer will generally be equal to the percentage of solids in the polymer solution being cast. However, lower or higher amounts of phosphor may be incorporated depending upon the particle size of the phosphor. Generally, the size of the particles of phosphor ranges from $.5\mu$ to $50\mu$, with sizes less than $25\mu$ being preferred. It is possible to incorporate 25% to 600% of the phosphor, based on the weight of the polymer, into the polymer, with amounts of 100% to 300% being preferred.

When spraying the polymer solution onto the conductive glass, a 1% to 20% solution of polymer may be used with a 3% to 8% solution being preferred. Other methods, e.g., casting, or spreading the polymer onto the conductive glass may enable the use of polymer solutions containing as high as 40% solids.

Atop this phosphor-containing polymer matrix is placed the second electrode. This may be a sheet of metal, usually aluminum. Sometimes however, this electrode is formed by metallizing the upper surface of the phosphor-containing polymer layer. This metallizing may be accomplished by any of several procedures well known in the art and the particular method utilized forms no part of the present invention.

Application of a suitable alternating current to the two electrodes results in the energization of the phosphor disseminated throughout the polymer matrix and light is transmitted through and emitted by the transparent surface.

The film layer of polymer comprising the matrix may, as mentioned above, be formed from a suitable solution. Solutions of adequately high concentration and sufficiently low viscosity are necessary. Solvents may be used in such concentration as is necessary to dissolve the polymer and enable casting thereof.

Any suitable phosphor may be used. In the instant discussion, activated zinc sulfide will be used as an illustration. It should be understood however, that any of the commercially available phosphors, many of which are set forth in the previously cited patents, may be used.

Spreading of the phosphor-containing solution of polymer on the surface to be treated may be done in any conventional manner. Procedures such as flowing, casting, spraying or doctoring are well understood in the art. The exact procedure used is not critical and forms no part of the present invention. As long as the method is capable of producing a good, uniform layer it may satisfactorily be used. After spreading, the film is then dried.

So far as is practical, each film or layer, if more than one is used, should be fully dried before application of the next layer. Generally, any method may be utilized for drying the film, with methods which enable recovery of the evolved solvent, considered most practical.

The thickness of the layer of the phosphor-containing matrix is usually governed by the desired end use of the electroluminescent device. Generally, the thickness of the film, if the phosphor is not contained in the matrix, must be great enough to completely cover the phosphor. However, the thickness is usually dependent upon the desired brightness of the lamp. The lamp can be made brighter by utilizing a higher voltage but this is somewhat complicated and brightness is often controlled by the thickness of the matrix; the thinner the matrix, the brighter the lamp.

As mentioned above, the top electrode is usually made of a metal, e.g., aluminum, and it is possible to bond the metal foil to the matrix by one of three different methods. None of the following methods are critical in the instant application and any of these may be utilized. The first method is to merely spray the aluminum onto the matrix and let it dry. The second method is well known in the art and is usually referred to as vacuum deposition and constitutes bonding the electrode by vacuum evaporation of a metal on a substrate. The third method is by mechanical lamination and this constitutes embedding an electrode on a substrate with heat, pressure or a combination thereof.

In regard to the electrical capacitors, the same high dielectric materials or mixtures thereof, as mentioned above, in regard to the electroluminescent devices may be used. However, it is especially preferred that copolymers be employed for this purpose. The use of copolymers is preferred due to the fact that the homopolymers of the acrylates and methacrylates of Formula I are very tacky and rubbery. Such properties are not conducive to production of the best capacitors and since the copolymers, containing at least 5% of comonomer, of said acrylates and methacrylates are less tacky and rubbery they enable the production of capacitors possessing the most desirable characteristics.

Heretofore, various materials have been utilized as the insulator in capacitors. However, for such reasons as impracticability, high cost, low dielectric constants and the like, the capacitors produced from these materials have not been completely satisfactory. By the use of copolymers of various cyanoalkoxy alkyl acrylates and methacrylates, capacitors may be produced which obviate most of the deficiencies that arise concerning those capacitors now commercially available, and in addition, said polymers enable the production of smaller capacitors having uses and properties equivalent to, or even better than, commercially available devices.

The copolymers of the cyanoalkoxy alkyl acrylates and methacrylates which may be used in the capacitors of the present invention may be used in any of several different physical forms. They may be dissolved in suitable solvents and then cast in the form of films or may be precipitated in the form of fibers and made into paper-like sheets and still give the beneficial properties mentioned above. Additionally, the copolymers of the cyanoalkoxy alkyl acrylates and methacrylates may be impregnated into or coated upon other materials such as kraft paper, glass fibers and the like and still be used in the form of sheets in the capacitors of the present invention. If this type of technique is used, it is preferred that the sheet material contain at least 25% by weight of the cyanoalkoxy alkyl acrylate or methacrylate copolymer.

These sheets of copolymeric material are then tightly wound interposed between metallic sheets which form the electrodes. The wound element is then inserted into the metal casing and connected to terminal contact members extending outside of the casing. All volatile material is removed and the casing is then permanently sealed.

In order that the invention may be more fully understood, reference is made to the accompanying drawing wherein preferred forms of the invention are illustrated and particularly described and wherein.

Figure 1:
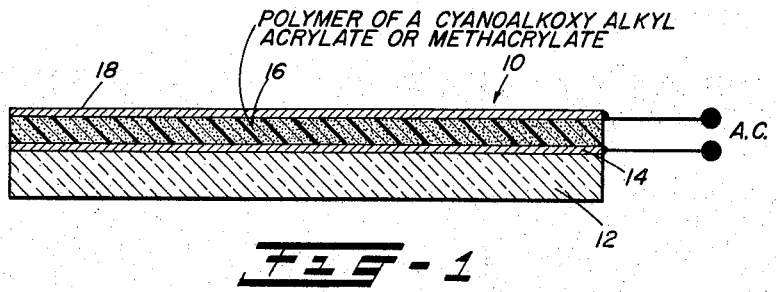
FIGURE 1 is a sectional, elevational view of a representation of a four layer electroluminescent device.

Referring now to the drawing, FIGURE 1, represents an electroluminescent lamp 10 which comprises a glass sheet 12 having a conductive coating of an electrode 14, generally tin oxide, thereon. Coated over the tin oxide layer 14, is a layer 16, comprising a phosphor-laden electroluminescent matrix, e.g., a polymer of a cyanoalkoxy alkyl acrylate or methacrylate. Coated over layer 16 is a second electrode 18 which generally consists of a sheet of aluminum. An alternating current applied across electrodes 14 and 18 results in energizing the phosphor disseminated throughout the matrix and light is transmitted through to and emitted by glass sheet 12.

Figure 2:
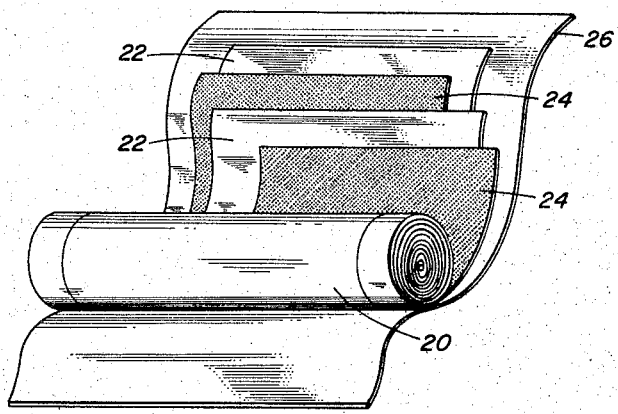
FIGURE 2 represents a view of a capacitor with a portion thereof unrolled.

In FIGURE 2, a capacitor 20 is shown with a portion thereof unrolled. The capacitor comprises alternating layers of metal electrodes 22, usually tin oxide, and sheets of dielectric material 24, i.e., a polymer of a cyanoalkoxy alkyl acrylate or methacrylate. The electrodes and dielectric layers are tightly wound and are then encased within metal casing 26, shown unrolled. When the casing is sealed and contact members, not shown, are connected to the electrode, a capacitor is formed.

Figure 3:
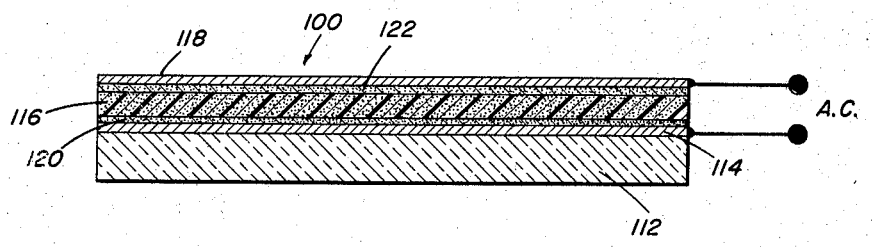
FIGURE 3 is a sectional, elevational view of a representation of a six layer electroluminescent device.

In FIGURE 3, an electroluminescent device 100 is shown. In this figure, the device consists of (A) a glass sheet 112 which has been coated with (B) a conductive metal 114, e.g., tin oxide, (C) a phosphor-bearing matrix 116 composed of any known material, for example, cyanoethylated cellulose, and (D) a second electrode 118, generally aluminum. The non-adhering components of the device are bonded to one another, according to the instant invention, with layers 120 and 122 of a cyanoalkoxy alkyl acrylate or methacrylate polymer. An alternating current applied across the electrodes 114 and 118 results in energizing the phosphor in matrix 116 and light is transmitted through to and emitted by glass sheet 112.

Although the above description of the present invention has dealt solely with the use of cyanoalkoxy alkyl acrylate and methacrylate polymers as the matrix of the electroluminescent devices or, as copolymers, the assembly of the capacitors, it is also possible to use the cyanoalkoxy alkyl acrylate and methacrylate polymers in conjunction with matrices and assemblies composed of known materials, e.g., cyanoethyl cellulose and the like. When a matrix or assembly of this type is utilized, the cyanoalkoxy alkyl acrylate and methacrylate polymers disclosed above may be employed as an adhesive layer between the matrix or assembly sheets and the electrically conductive layer, i.e., the glass sheet or metal electrode. Alternatively, the cyanoalkoxy alkyl acrylate and methacrylate polymers may be blended with the cyanoethyl cellulose, e.g., and employed as the matrix or assembly, as such. When a matrix or assembly of this latter type is utilized, it is preferred that it contains at least 5% of the cyanoalkoxy alkyl acrylate or methacrylate polymer. This novel method of adhering the conductive layers or assembly sheets results in the production of products which are superior to most commercially available products in this field.

The following examples are set forth for purposes of illustration only and are not to be construed as limitations on the present invention except as set forth in the appended claims. All parts and percentages are by weight unless otherwise specified.

EXAMPLE 1

*Polymerization of 2-(2-cyanoethoxy)ethyl acrylate*

To a suitable reaction vessel, equipped with a heating mantle, mechanical stirrer, gas inlet tube and reflux condenser, are added 60 parts of acetonitrile. The gas inlet tube is adjusted to extend into the liquid layer and a slow stream of pre-purified nitrogen is bubbled through the liquid for ½ hour. To this liquid is then added 15 parts of 2-(2-cyanoethoxy)ethyl acrylate and deaeration with nitrogen is continued for another ½ hour. At the end of this time, 0.075 part of recrystallized 2,2'-azo-bis-isobutyronitrile is added. The gas inlet tube is adjusted so as not to extend into the reaction mixture and nitrogen is passed through the reaction vessel for another ½ hour. The reaction mixture is then heated to reflux temperature and maintained at reflux under the continued slow stream of nitrogen for 5 hours. The reaction mixture is then cooled and poured slowly, with constant stirring, into cold, distilled methanol. The polymer precipitates as a tacky, semi-solid mass and, after washing with fresh portions of methanol and drying in a vacuum oven, 12.2 parts of polymer are recovered representing a conversion of 81.3%. The dry polymer is then dissolved in acetonitrile and a film is cast therefrom on lead foil, dried and electrically tested according to ASTM test D–150–54T at 60 cycles per second, 25° C. under atmosphere of dry nitrogen. The test results indicated a dielectric constant of 29.9.

EXAMPLE 2

Following the procedure of Example 1, except that an equivalent amount of 2-(2-cyano-1-phenylethoxy)ethyl methacrylate is substituted for the acrylate therein, a polymer is recovered with properties similar to that of the polymer of Example 1.

EXAMPLE 3

Again following the procedure of Example 1, except that an equivalent amount of 5-(2-cyanoethoxy)-pentyl acrylate is substituted as the feed material, a polymer is recovered with a dielectric constant similar to that set out for the polymer recovered in Example 1.

EXAMPLE 4

Following the procedure of Example 1, except that an equivalent amount of 2-[2-(2-cyano-1-methylethoxy)ethoxy]ethyl methacrylate is substituted for the acrylate therein, a polymer is recovered with properties similar to that of the polymer of Example 1.

EXAMPLE 5

Again utilizing the procedure of Example 1, a polymer having similar properties to that recovered therein is recovered by charging an equivalent amount of 2-(2-cyanopropoxy)propyl acrylate, to the reaction vessel is charged therein.

EXAMPLE 6

*Fabrication of electroluminescent device*

To a 30% by weight acetonitrile solution of the polymer produced in Example 1 is added 300% by weight of an electroluminescent phosphor. The phosphor is uniformly disseminated throughout the solution by a rolling agitation technique. An approximately 1.5 mil film of the resulting suspension is cast onto a conductive glass plate. After suitable drying to remove residual solvent, a back electrode is attached by the vacuum deposition of a thin film of aluminum. Electrical contacts are then attached to the aluminum electrode and conductive glass electrode and a brilliant lamp results. Adhesion of the components of the lamp to each other is excellent.

EXAMPLE 7

Utilizing the fabrication procedure of Example 6, a brilliant lamp is produced employing a solution of the polymer produced in Example 2 containing 450 percent by weight of an electroluminescent phosphor. Again an excellent adhesion of the components to one another results.

EXAMPLE 8

Following the procedure of Example 6 except that a phosphor laden (350% by weight) solution of the polymer produced in Example 3 is employed, a brilliant lamp is produced, the components of which are rigidly adhered to one another.

EXAMPLE 9

Again following the lamp fabrication technique of Example 6, a lamp having a brilliant luminescence is produced utilizing a solution of the polymer of Example 4 containing 400%, by weight, of an electroluminescent phosphor. The components thereof are excellently held together without the addition of extraneous adhesives.

EXAMPLE 10

Utilizing a 300%, by weight, phosphor solution of the polymer recovered in Example 5, a brilliant lamp is produced by following the technique of Example 6. Adhesion of the components is excellent.

EXAMPLE 11

A brilliant lamp is produced following the fabrication technique of Example 6, utilizing as the matrix thereof a phosphor laden (375% by weight) copolymer of 2-(2-cyanoethoxy)ethyl acrylate and methyl methacrylate (90/10) produced according to the process set out in Example 1. The components of the lamp were rigidly bonded to one another.

EXAMPLE 12

An electroluminescent phosphor (450%, by weight) is added to a 33%, by weight, acetonitrile solution of a homopolymer of 2-(2-cyanoethoxy)ethyl methacrylate. The phosphor is then uniformly disseminated throughout the solution and a 1 mil film of the resulting suspension is cast onto a conductive glass plate. The film is dried to remove residual solvent and an aluminum electrode in the form of a thin film is attached thereto. Electrical contacts are connected to the aluminum electrode and glass plate and a brilliant lamp results.

EXAMPLE 13

A phosphor laden (50% by weight) free film of a commercially available dielectric polymeric material is sandwiched between a conductive glass plate and an aluminum film electrode. Each surface of the dielectric polymeric material is coated with a thin film of poly[2-(2-cyanoethoxy)ethyl acrylate] as an adhesive. Pressure is applied to the structure and after allowing the adhesive to set and attaching electrical contacts to the electrodes, a satisfactory lamp results.

EXAMPLE 14

*Fabrication of a capacitor*

A capacitor is prepared by placing a 2 to 3 mil film of a 2-(2-cyanoethoxy)ethyl acrylate-acrylonitrile (70/30) copolymer between two sheets of aluminum. The sheets are insulated and are then wound together tightly and inserted into a casing. The aluminum foil electrodes are then connected to contact members in the casing which is then sealed. The capacitance of the capacitor is very high as compared to commercially available devices.

EXAMPLE 15

*Preparation of a capacitor*

A capacitor is prepared by very tightly winding a sheet of kraft paper impregnated with 40% of a copolymer of 2-(2-cyanoethoxy)ethyl acrylate (80%) and methyl methacrylate (20%) between two insulated sheets of aluminum foil. After impregnation, the kraft paper has a thickness of 1.5 mils. The wound sheets are placed in a metal container and the electrodes are connected to terminals in the container which is then sealed. The resulting capacitor has an effective dielectric constant greater than a similar commercially available capacitor containing impregnated kraft paper.

We claim:

1. A phosphor-bearing matrix comprising a phosphor uniformly disseminated throughout a polymer of a compound having the formula $$CH_2=C-C-O[R_1]O-C-C-CN$$
$$\begin{array}{cccc} R & O & H & H \\ | & \| & | & | \\ & & R_3 & R_2 \end{array}$$

wherein R is selected from the group consisting of hydrogen and methyl radicals, $R_1$ is selected from the group consisting of $(-CH_2-)_n$, $$-CH_2-CH_2-O-CH_2-CH_2-$$

and $$-CH_2-CH- \atop | \atop CH_3$$

radicals, wherein $n$ is a whole positive integer of from 2 to 5, inclusive, $R_2$ is selected from the group consisting of hydrogen and a methyl radical and $R_3$ is selected from the group consisting of hydrogen, a methyl radical and a $C_6H_5$ radical wherein at least one of $R_2$ and $R_3$ is hydrogen.

2. A phosphor-bearing matrix comprising a phosphor uniformly disseminated throughout a polymer of 2-(2-cyanoethoxy)ethyl acrylate.

3. An electroluminescent device comprising a light-conductive layer, one surface of which has unitarily embedded therein an electrically conductive layer, and superimposed on said electrically conductive layer, a layer comprising a phosphor-bearing dielectric matrix, and superimposed on said matrix a second electrically conductive layer, said matrix comprising a polymer of a compound having the formula

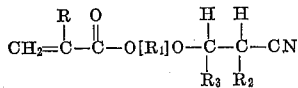

wherein R is selected from the group consisting of hydrogen and a methyl radical, $R_1$ is selected from the group consisting of ($(-CH_2)_n$,

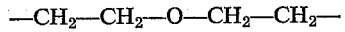

and

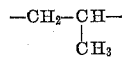

radicals, wherein $n$ is a whole positive integer of from 2 to 5, inclusive, $R_2$ is selected from the group consisting of hydrogen and a methyl radical and $R_3$ is selected from the group consisting of hydrogen, a methyl radical and a $C_6H_5$ radical wherein at least one of $R_2$ and $R_3$ is hydrogen.

4. A structure according to claim 3 in which the phosphor-bearing matrix is composed of a polymer of 2-(2-cyanoethoxy)ethyl acrylate.

5. An assembly suitable for use in a capacitor comprising electrodes separated and insulated from one another by a material comprising a copolymer of a compound having the formula

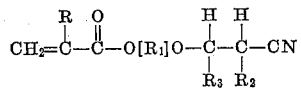

wherein R is selected from the group consisting of hydrogen and a methyl radical, $R_1$ is selected from the group consisting of $(-CH_2-)_n$, $$-CH_2-CH_2-O-CH_2-CH_2-$$

and

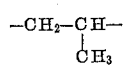

radicals, wherein $n$ is a whole positive integer of from 2 to 5, inclusive, $R_2$ is selected from the group consisting of hydrogen and a methyl radical and $R_3$ is selected from the group consisting of hydrogen, a methyl radical and a $C_6H_5$ radical wherein at least one of $R_2$ and $R_3$ is hydrogen, and an ethylenically unsaturated monomer copolymerizable therewith.

6. An assembly suitable for use in a capacitor comprising electrodes separated and insulated from one another by a material comprising a copolymer of 2-(2-cyanoethoxy)ethyl acrylate and an ethylenically unsaturated monomer copolymerizable therewith.

7. An electrical capacitor comprising, in combination, electrodes, a material separating and insulating the electrodes from one another, said material comprising a copolymer of a compound having the formula

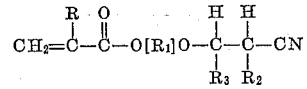

wherein R is selected from the group consisting of hydrogen and a methyl radical, $R_1$ is selected from the group consisting of $(-CH_2-)_n$, $$-CH_2-CH_2-O-CH_2-CH_2-$$

and

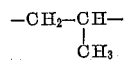

radicals, wherein $n$ is a whole positive integer of from 2 to 5, inclusive, $R_2$ is selected from the group consisting of hydrogen and a methyl radical and $R_3$ is selected from the group consisting of hydorgen, a methyl radical and a $C_6H_5$ radical wherein at least one of $R_2$ and $R_3$ is hydrogen, and an ethylenically unsaturated monomer copolymerizable therewith.

8. An electrical capacitor according to claim 7 wherein said material comprises a copolymer of 2-(2-cyanoethoxy)ethyl acrylate and an ethylenically unsaturated monomer copolymerizable therewith.

9. An electrical capacitor comprising, in combination, a pair of electrodes composed of an electrically conductive metal, and a sheet material separating and insulating said electrodes from one another, said sheet material comprising a sheet of kraft paper impregnated with at least 25% of a copolymer of a compound having the formula

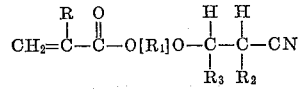

wherein R is selected from the group consisting of hydrogen and a methyl radical, $R_1$ is selected from the group consisting of $(-CH_2-)_n$, $$-CH_2-CH_2-O-CH_2-CH_2-$$

and

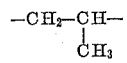

radicals, wherein $n$ is a whole positive integer of from 2 to 5, inclusive, $R_2$ is selected from the group consisting of hydrogen and a methyl radical and $R_3$ is selected from the group consisting of hydrogen, a methyl radical and a $C_6H_5$ radical, wherein at least one of $R_2$ and $R_3$ is hydrogen, and an ethylenically unsaturated monomer copolymerizable therewith.

10. A method of bonding the components of an electroluminescent device to one another which comprises interposing between said components an adhesive material having a high dielectric constant and comprising a polymer of a compound having the formula

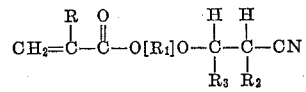

wherein R is selected from the group consisting of hydrogen and a methyl radical, $R_1$ is selected from the group consisting of $(-CH_2-)_n$, $$-CH_2-CH_2-O-CH_2-CH_2-$$

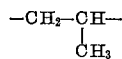

and $-CH_2-CH-$
 $|$
 $CH_3$ radicals wherein $n$ is a whole positive integer of from 2 to 5, inclusive, $R_2$ is selected from the group consisting of hydrogen and a methyl radical and $R_3$ is selected from the group consisting of hydrogen, a methyl radical and a $C_6H_5$ radical wherein at least one of $R_2$ and $R_3$ is hydrogen.

11. A method according to claim 10 wherein the adhesive material is a polymer of 2-(2-cyanoethoxy)-ethyl acrylate.

References Cited by the Examiner

UNITED STATES PATENTS

| | | | |
|---|---|---|---|
| 2,039,734 | 5/36 | Meder et al. | 252—301.3 |
| 2,774,737 | 12/56 | Mager | 252—301.3 |
| 2,901,652 | 8/59 | Fridrich | 313—108 |
| 2,916,680 | 12/59 | Ross | 317—258 |
| 2,966,604 | 12/60 | Dombrowski | 313—108 |
| 3,016,481 | 1/62 | Simpson | 317—258 |
| 3,018,402 | 1/62 | Lewis | 313—108 |
| 3,027,329 | 3/62 | Grimmeiss | 252—301 |
| 3,113,881 | 12/63 | Spurgeon | 260—46.5 |

GEORGE N. WESTBY, *Primary Examiner.*

MAURICE A. BRINDISI, ARTHUR GAUSS,
*Examiners.*